United States Patent
Chowdhury et al.

(10) Patent No.: US 9,702,703 B2
(45) Date of Patent: Jul. 11, 2017

(54) SYSTEM AND METHOD FOR MONITORING DRIVING BEHAVIOR OF A DRIVER

(71) Applicant: Tata Consultancy Services Limited, Mumbai (IN)

(72) Inventors: Arijit Chowdhury, Kolkata (IN); Tapas Chakravarty, Kolkata (IN); Tanushree Banerjee, Kolkata (IN); Balamuralidhar Purushothaman, Banagalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/074,641

(22) Filed: Mar. 18, 2016

(65) Prior Publication Data
US 2016/0282124 A1 Sep. 29, 2016

(30) Foreign Application Priority Data
Mar. 27, 2015 (IN) .......... 1088/MUM/2015

(51) Int. Cl.
*G06F 7/70* (2006.01)
*G01C 21/16* (2006.01)
(Continued)

(52) U.S. Cl.
CPC .......... *G01C 21/165* (2013.01); *B60W 40/09* (2013.01); *G07C 5/0816* (2013.01)

(58) Field of Classification Search
CPC .......... G01C 21/16; B60W 40/09; G07C 5/00
(Continued)

(56) References Cited

U.S. PATENT DOCUMENTS 8,612,170 B2 * 12/2013 Smith .......... G01L 5/0052
702/113
2011/0267185 A1 11/2011 Zhang et al.
(Continued)

FOREIGN PATENT DOCUMENTS

WO  WO 01/81147 A1  11/2001
WO  WO 2014/140107 A1  9/2014

OTHER PUBLICATIONS

Liu, J., "A Micro-Measure for Automobile Driving Volatility", TSITE Student Paper Competition, pp. i, ii, and 1-17, (2014).

*Primary Examiner* — Thomas G Black
*Assistant Examiner* — Luke Huynh
(74) *Attorney, Agent, or Firm* — Finnegan, Henderson, Farabow, Garrett & Dunner, L.L.P.

(57) ABSTRACT

This disclosure relates generally to data processing, and more particularly to a system and method for monitoring driving behavior of a driver. In one embodiment, a system (102) for monitoring driving behavior of a driver is disclosed. The system (102) may configure a processor (202) to execute computer-readable instructions (208) stored in a memory (206) in order to: capture a plurality of acceleration samples; compute Kurtosis values and Skewness values corresponding to a set of acceleration samples; filter the Kurtosis values; determine a probability distribution function of the filtered Kurtosis values; compute a mean and a standard deviation associated with the filtered Kurtosis values; determine a first threshold for each driver based upon the mean and the standard deviation; compute a first score for each driver based upon the first threshold and the number of trips; determine a second threshold; compute a second score for each driver based upon the second threshold and the number of trips; and evaluate driving behavior of a driver based upon the first score and the second score.

11 Claims, 4 Drawing Sheets

(51) Int. Cl.
*G07C 5/08* (2006.01)
*B60W 40/09* (2012.01)

(58) Field of Classification Search
USPC ........................................ 701/70, 32.4, 33.7
See application file for complete search history.

(56) References Cited

U.S. PATENT DOCUMENTS

2013/0325284 A1* 12/2013 Sato ..................... G08G 1/0112
　　　　　　　　　　　　　　　　　　　　　　　701/96
2014/0180730 A1　　 6/2014　Cordova et al.

* cited by examiner

SYSTEM AND METHOD FOR MONITORING DRIVING BEHAVIOR OF A DRIVER

PRIORITY CLAIM

This U.S. patent application claims priority under 35 U.S.C. §119 to: India Application No. 1088/MUM/2015, filed on Mar. 27, 2015. The entire contents of the aforementioned application are incorporated herein by reference.

TECHNICAL FIELD

The present disclosure described herein, in general, relates to data processing, more particularly to a system and method for monitoring driving behavior of a driver based upon statistical analysis of acceleration data.

BACKGROUND

Monitoring and evaluating driving skills of a driver is of utmost importance, especially in view of the steep increase in accident across the globe in recent times. In the existing art, the driving skills have been evaluated by creating a data recording system and using machine learning to identify aggressiveness and skill of the driver. However, the existing methods relying on machine learning techniques require large training datasets. Majority of the other existing methods record vehicular data from On-board device (OBD), dedicated hardware, camera mounted on the vehicle and then uses multisensory data to characterize driver behavior. Further, the statistical analysis techniques have been proposed which uses standard deviation and mean of obtained acceleration for a driver's data. Further, some of the existing techniques compute driving risk by putting fixed thresholds in acceleration measurement. Thus, instances of such anomaly greatly affect a driver's risk score. Such thresholds are also subject to measurement errors. Further, there have been attempts made in the existing art to create driver profile from acceleration data using time domain and/or frequency domain analysis. Further, existing techniques rely on event-based approach for detecting driving behavior of a driver. The event-based approach involves analyzing data samples captured for shorter time period duration and identifies a specific event based upon the analysis, wherein the specific event facilitates to determine the driving behavior of the driver. However, the event-based approach is susceptible to errors since the analysis is performed on the data samples captured for shorter time period. For example, a driver may be ill while driving a vehicle for a specific time interval and hence drive the vehicle in abnormal condition. However, the existing event-based approach will still categorize the driving profile of the driver as 'risky profile' even if the driver is driving the vehicle in the normal condition for another time intervals.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce concepts related to systems and methods for monitoring driving behavior of a driver and the concepts are further described below in the detailed description. This summary is not intended to identify essential features of the disclosure nor is it intended for use in determining or limiting the scope of the disclosure.

In one implementation, a system for monitoring driving behavior of a driver is disclosed. In one aspect, the system may comprise a processor and a memory coupled to the processor. The processor may be configured to execute computer-readable instructions stored in the memory. The processor may be configured to execute a computer-readable instruction in order to capture a plurality of acceleration samples associated with a plurality of trips completed by a plurality of drivers at a predefined time interval. The processor may further be configured to execute a computer-readable instruction in order to compute Kurtosis values and Skewness values corresponding to a set of acceleration samples, of the plurality of acceleration samples, associated with each driver. The processor may be configured to execute a computer-readable instruction in order to filter the Kurtosis values to obtain filtered Kurtosis values, wherein the Kurtosis values are filtered based upon the Skewness values. Further, the processor may be configured to execute a computer-readable instruction in order to determine a probability distribution function of the filtered Kurtosis values. The processor may further be configured to execute a computer-readable instruction in order to compute a mean and a standard deviation associated with the filtered Kurtosis values based upon the probability distribution function. Further, the processor may be configured to execute a computer-readable instruction in order to determine a first threshold for each driver based upon the mean and the standard deviation. The processor may further be configured to execute a computer-readable instruction in order to compute a first score for each driver based upon a number of trips having a kurtosis value greater than the first threshold and the plurality of the trips. Further, the processor may be configured to execute a computer-readable instruction in order to determine a second threshold, wherein the second threshold is a minimum of the first threshold determined for each of the plurality of drivers. The processor may further be configured to execute a computer-readable instruction in order to compute a second score for each driver based upon a number of trips having a kurtosis value greater than the second threshold and the plurality of the trips. The processor may further be configured to execute a computer-readable instruction in order to monitor driving behavior of the driver based upon the first score and the second score. In one embodiment, the processor may further be configured to execute a computer-readable instruction in order to evaluate the driving behavior of the driver with respect to one or more other drivers by comparing the first score and the second score of the driver with the first score and the second score, respectively, associated with the one or more other drivers.

In another implementation, a method for monitoring driving behavior of a driver is disclosed. The method may comprise capturing, by a processor, a plurality of acceleration samples associated with a plurality of trips completed by a plurality of drivers at a predefined time interval. The method may further comprise computing, by the processor, Kurtosis values and Skewness values corresponding to a set of acceleration samples, of the plurality of acceleration samples, associated with each driver. The method may further comprise filtering, by the processor, the Kurtosis values to obtain filtered Kurtosis values, wherein the Kurtosis values are filtered based upon the Skewness values. The method may further comprise determining, by the processor, a probability distribution function of the filtered Kurtosis values. The method may further comprise computing, by the processor, a mean and a standard deviation associated with the filtered Kurtosis values based upon the probability distribution function. The method may further comprise determining, by the processor, a first threshold for each driver based upon the mean and the standard deviation. The method may further comprise computing, by the processor, a first score for each driver based upon a number of trips having a kurtosis value greater than the first threshold and the plurality of the trips. The method may further comprise determining, by the processor, a second threshold, wherein the second threshold is a minimum of the first threshold determined for each of the plurality of drivers. The method may further comprise computing, by the processor, a second score for each driver based upon a number of trips having a kurtosis value greater than the second threshold and the plurality of the trips. The method may further comprise monitoring, by the processor, driving behavior of the driver based upon the first score and the second score. In one embodiment, the method may further comprise evaluating, by the processor, the driving behavior of the driver with respect to one or more other drivers by comparing the first score and the second score of the driver with the first score and the second score, respectively, associated with the one or more other drivers.

In yet another implementation, non-transitory computer readable medium embodying a program executable in a computing device for monitoring driving behavior of a driver is disclosed is disclosed. The program may comprise a program code for capturing a plurality of acceleration samples associated with a plurality of trips completed by a plurality of drivers at a predefined time interval. Further, the program may comprise a program code for computing Kurtosis values and Skewness values corresponding to a set of acceleration samples, of the plurality of acceleration samples, associated with each driver. Further, the program may comprise a program code for filtering the Kurtosis values to obtain filtered Kurtosis values, wherein the Kurtosis values are filtered based upon the Skewness values. Further, the program may comprise a program code for determining a probability distribution function of the filtered Kurtosis values. Further, the program may comprise a program code for computing a mean and a standard deviation associated with the filtered Kurtosis values based upon the probability distribution function. The program may further comprise a program code for determining a first threshold for each driver based upon the mean and the standard deviation. The program may further comprise a program code for computing a first score for each driver based upon a number of trips having a kurtosis value greater than the first threshold and the plurality of the trips. The program may further comprise a program code for determining a second threshold, wherein the second threshold is a minimum of the first threshold determined for each of the plurality of drivers. Further, the program may comprise a program code for computing a second score for each driver based upon a number of trips having a kurtosis value greater than the second threshold and the plurality of the trips. Further, the program may comprise a program code for monitoring driving behavior of the driver based upon the first score and the second score. In one embodiment, the program may comprise a program code for evaluating the driving behavior of the driver with respect to one or more other drivers by comparing the first score and the second score of the driver with the first score and the second score, respectively, associated with the one or more other drivers.

BRIEF DESCRIPTION OF THE DRAWINGS

The foregoing summary as well as detailed description of embodiments of the present disclosure is better understood when read in conjunction with the appended drawings. For the purpose of illustrating the disclosure, there is shown in the present document example constructions of the disclosure; however, the disclosure is not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

While aspects of described system and method for monitoring driving behavior of a driver may be implemented in any number of different computing systems, environments, and/or configurations, the embodiments are described in the context of the following exemplary system.

Figure 1:
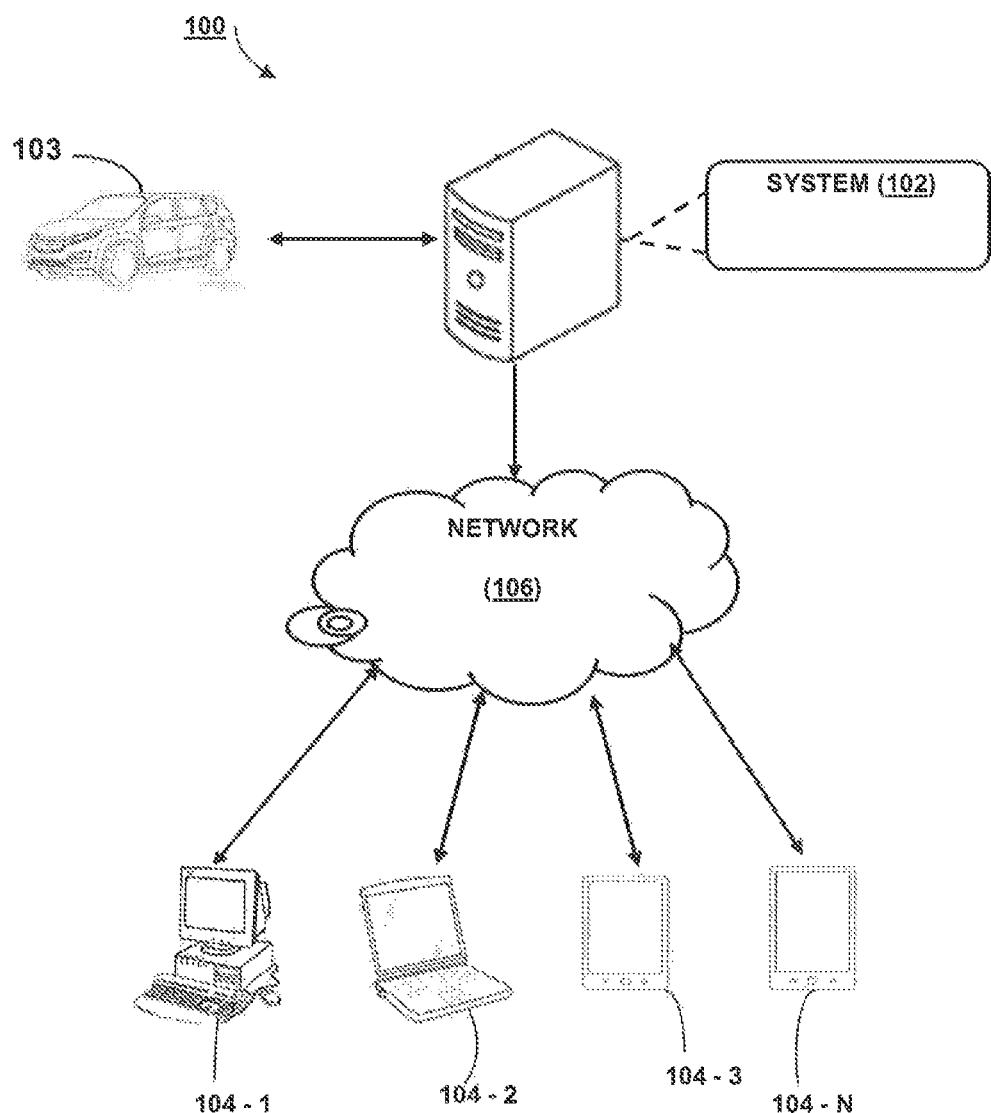
FIG. 1 illustrates a network implementation of a system for monitoring driving behavior of a driver, in accordance with an embodiment of the present disclosure.

Referring now to FIG. 1, a network implementation 100 of a system 102 for monitoring driving behavior of a driver is illustrated, in accordance with an embodiment of the present subject matter. The system 102 may capture a plurality of acceleration samples associated with a plurality of trips completed by a plurality of drivers at a predefined time interval. In one embodiment, the acceleration samples may be captured based upon a speed of a vehicle 103 driven by each driver. The system 102 may compute Kurtosis values and Skewness values corresponding to a set of acceleration samples, of the plurality of acceleration samples, associated with each driver. The system 102 may further filter the Kurtosis values to obtain filtered Kurtosis values, wherein the Kurtosis values are filtered based upon the Skewness values. In one embodiment, the Kurtosis values may be filtered by retaining a set of Kurtosis values having corresponding Skewness values close to zero. The system 102 may further determine a probability distribution function of the filtered Kurtosis values. In one embodiment, the probability distribution function may be determined by removing outliers from the filtered Kurtosis values and fitting the filtered Kurtosis values, after the removal of the outliers, into a normal distribution function. The system 102 may further compute a mean and a standard deviation associated with the filtered Kurtosis values based upon the probability distribution function.

The system 102 may further determine a first threshold for each driver based upon the mean and the standard deviation. In one embodiment, the first threshold may be determined using a formula, $T_h = \mu + 2\sigma$, wherein $T_h$ indicates the first threshold, $\mu$ indicates the mean and a indicates the standard deviation. The system 102 may further compute a first score for each driver based upon a number of trips having a kurtosis value greater than the first threshold and the plurality of the trips. In one embodiment, the first score may be computed using a formula, $AI = N_K/N_T$, wherein AI indicates the first score, $N_K$ indicates the number of trips having the kurtosis value greater than the first threshold and $N_T$ indicates the plurality of trips. The system 102 may further determine a second threshold, wherein the second threshold is a minimum of the first threshold determined for each of the plurality of drivers. The system 102 may further compute a second score for each driver based upon a number of trips having a kurtosis value greater than the second threshold and the plurality of the trips. In one embodiment, the second score may be computed using a formula, $AI(N) = N_N/N_T$, wherein AI(N) indicates the second score, $N_N$ indicates the number of trips having the kurtosis value greater than the second threshold and $N_T$ indicates the plurality of trips. The system 102 may further monitor driving behavior of the driver based upon the first score (AI) and the second score (AI(N)). In one embodiment, the system 102 may further evaluate the driving behavior of a driver with respect to one or more other drivers by comparing the first score and the second score of the driver with the first score and the second score, respectively, associated with the one or more other drivers.

Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, a cloud-based computing environment and the like. It will be understood that the system 102 may be accessed by multiple users through one or more user devices 104-1, 104-2 . . . 104-N, collectively referred to as user devices 104 hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106. Further, the system 102 may be coupled with the vehicle 103 as shown in FIG. 1. The vehicle 103 may transmit, to the system 102, speed of the vehicle 103 measured using one of speed measuring sensors (not shown in FIG. 1) including a GPS sensor, an accelerometer sensor, an OBD II speed measurement device or a dedicated navigation device installed in the vehicle 103.

In one implementation, the network 106 may be a wireless network, a wired network or a combination thereof. The network 106 can be implemented as one of the different types of networks, such as intranet, local area network (LAN), wide area network (WAN), the Internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
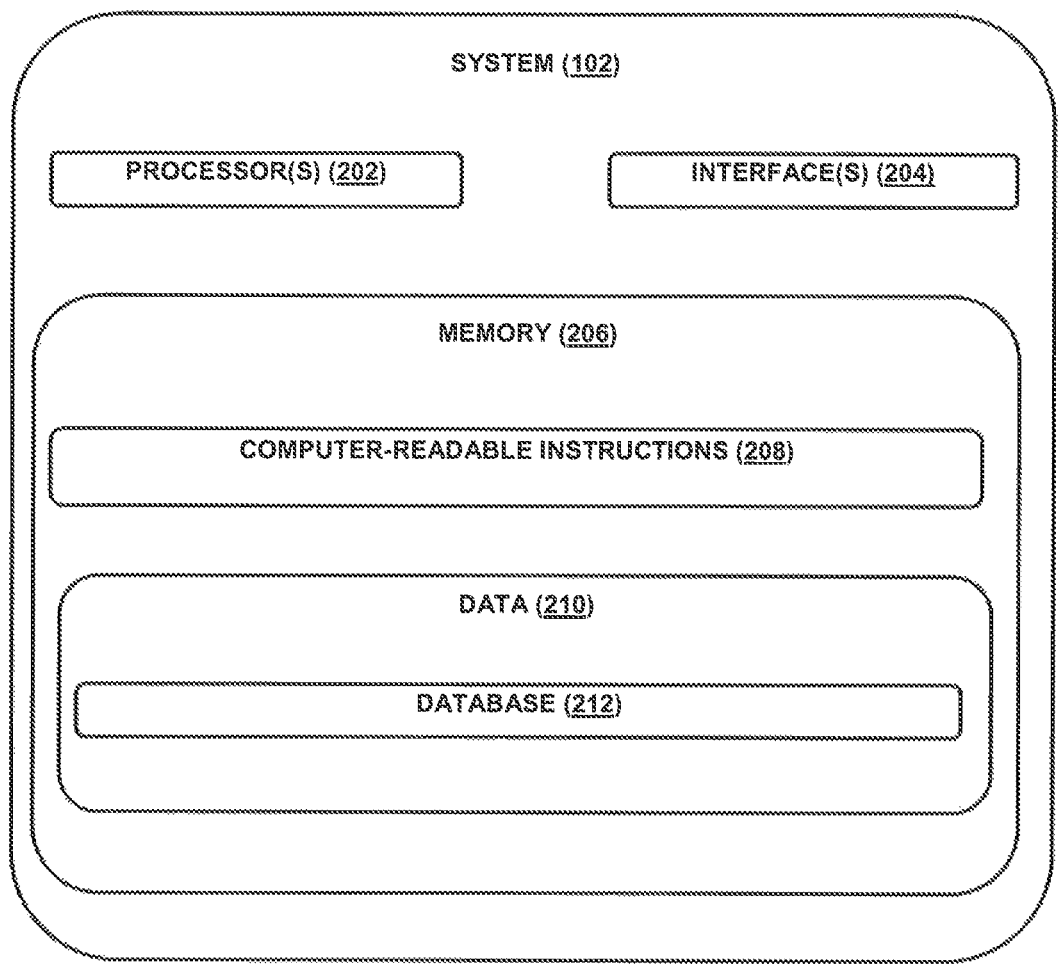
FIG. 2 illustrates the system, in accordance with an embodiment of the present subject matter.

Referring now to FIG. 2, the system 102 is illustrated in accordance with an embodiment of the present disclosure. In one embodiment, the system 102 may include a processor 202, an input/output (I/O) interface 204, and a memory 206. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions 208 stored in the memory 206.

The I/O interface 204 may include a variety of software and hardware interfaces, for example, a web interface, a graphical user interface, and the like. The I/O interface 204 may allow the system 102 to interact with the user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include computer-readable instructions 208 and data 210.

The computer-readable instructions 208 include routines, programs, objects, components, data structures, etc., which perform particular tasks or implement particular abstract data types. The computer-readable instructions 208 may include programs or coded instructions that supplement applications and functions of the system 102. The computer-readable instructions 208 described herein may be implemented as software modules that may be executed in the cloud-based computing environment of the system 102.

The data 210, amongst other things, serves as a repository for storing data processed, received, and generated by one or more of the computer-readable instructions 208. The data 210 may also include a database 212.

In one implementation, at first, a user may use one of the user devices 104 to access the system 102 via the I/O interface 204. The user may register themselves using the I/O interface 204 in order to use the system 102. In one aspect, the system 102 may enable monitoring driving behavior of a driver using the computer-readable instructions 208. Further, the system 102 may implement a method 300 illustrated in FIG. 3 by configuring the processor 202 to execute the computer-readable instructions 208. The detailed description of the method 300 is further described referring to FIGS. 2 and 3 as below.

Figure 3:
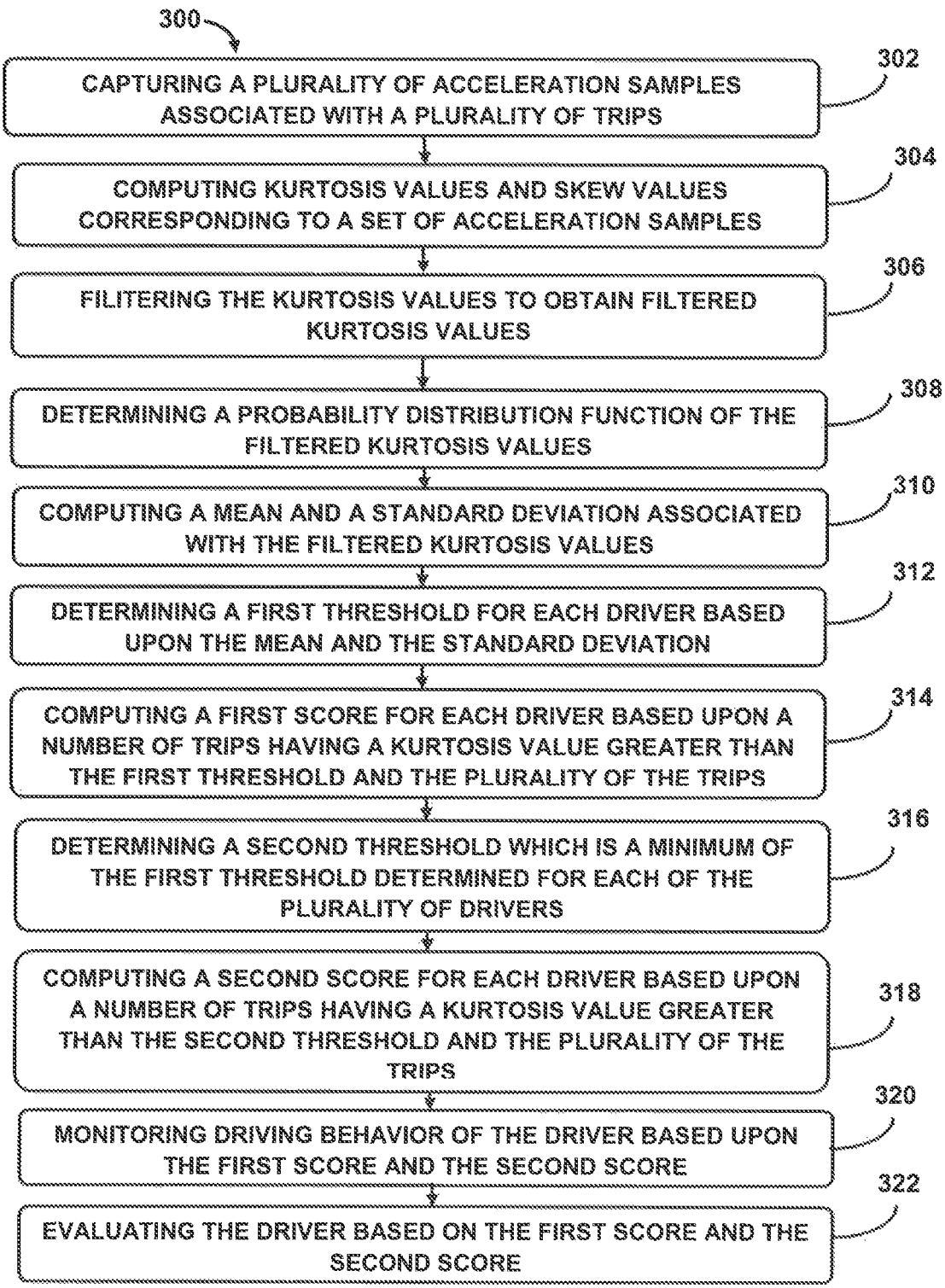
FIG. 3 illustrates a method for monitoring driving behavior of a driver, in accordance with an embodiment of the present disclosure.

Referring to FIG. 3, the method 300 for monitoring driving behavior of a driver is shown, in accordance with an embodiment of the present disclosure. The method 300 may be described in the general context of computer executable instructions. Generally, computer executable instructions can include routines, programs, objects, components, data structures, procedures, modules, functions, etc., that perform particular functions or implement particular abstract data types. The method 300 may be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the disclosure described herein. Furthermore, the method can be implemented in any suitable hardware, software, firmware, or combination thereof. However, for ease of explanation, in the embodiments described below, the method 300 may be considered to be implemented in the above described in the system 102.

At block 302, the processor 202 may capture a plurality of acceleration samples associated with a plurality of trips. In one implementation, the plurality of acceleration samples may be captured based upon speed of the vehicle 103. In some embodiments, the speed may be measured using one of a GPS sensor, an accelerometer sensor, an OBD II device or a dedicated navigation device installed in the vehicle 103. The plurality of acceleration samples represent data measured corresponding to the plurality of trips. In one embodiment, a trip is a completed journey for a driver for duration of at least 10 minutes. The plurality of acceleration samples may be segregated into multiple windows such that each window comprises acceleration samples captured corresponding to two months for each driver. Further, each window of two months is sliding with overlap of one month. In one embodiment, the plurality of acceleration samples correspond to 30-40 completed trips by each driver for the window period of two months. The plurality of acceleration samples may be stored in the database 212.

At block 304, the processor 202 may compute kurtosis values and Skewness values corresponding to a set of acceleration samples of the plurality of acceleration samples. The set of acceleration samples correspond to each driver. In an embodiment, the kurtosis values and the Skewness values may be computed corresponding to each trip completed by each driver. Skewness and Kurtosis represent a normalized third and fourth moments about mean, respectively. Further, the computation of the Kurtosis and the for acceleration samples using standard statistical formulae is fairly known in the art.

At block 306, the processor 202 may filter the kurtosis values in order to obtain filtered kurtosis values. The processor 202 may verify whether a Skewness value corresponding to each kurtosis value is close to zero. The processor 202, based upon the verification, may retain a set of Kurtosis values having corresponding Skewness values close to zero. The filtered kurtosis values may be stored corresponding to each driver in the database 212. Particularly, at least one filtered Kurtosis value is stored corresponding to a driver identifier (ID), a trip identifier (ID) and a time duration associated with the trip. Similarly, a set of Kurtosis values corresponding to each driver is stored in the database 212. Therefore, the database 212 may comprise the set of Kurtosis values computed for each trip of predefined time duration corresponding to each driver. In one exemplary embodiment, for a driver with 30 trips the processor 202 may capture 30 acceleration samples. Hence, for this driver the Kurtosis dataset may include 30 values, assuming all the Skewness values are close to zero.

At block 308, the processor 202 may determine a probability distribution function of the filtered kurtosis values. Specifically, in one embodiment, the filtered Kurtosis values stored corresponding to each driver for the window of two months (the window is sliding with one month overlap data) may be retrieved for the plurality of trips from the database 212. Further, journey time corresponding to the plurality of trips for each driver may be computed using time duration stored in the database 212 corresponding to each trip completed by each driver. The time duration is identified from the database 212 based upon the driver ID associated with each driver. Further, corresponding to each driver, total number of trips and total duration of trips may be computed. The total duration of trips indicates sum of journey time of the plurality of trips completed by each driver. Additionally, the outliers may be removed from the filtered Kurtosis values. The processor 202 may fit a normal distribution for the remaining filtered Kurtosis values and determines the probability distribution function associated with the remaining filtered Kurtosis values.

At block 310, the processor 202 may compute a mean ($\mu$) and a standard deviation ($\sigma$) associated with the filtered kurtosis values using the probability distribution function. Specifically, the mean ($\mu$) and the standard deviation ($\sigma$) may be computed for the remaining filtered Kurtosis values. The computation of the mean ($\mu$) and the standard deviation ($\sigma$) using standard statistical formulae is fairly known in the art.

At block 312, the processor 202 may determine a first threshold ($T_h$) for each driver based upon the mean ($\mu$) and the standard deviation ($\sigma$). The first threshold ($T_h$) may be stored corresponding to each driver in the database 212. Specifically, the first threshold ($T_h$) may be stored corresponding to each driver ID in the database 212. In one embodiment, the first threshold ($T_h$) may be determined using a formula, $$T_h = \mu + 2\sigma \quad (1)$$

At block 314, the processor 202 may compute a first score for each driver based upon a number of trips having a kurtosis value greater than the first threshold and the plurality of the trips. In one implementation, the first score is an Abnormality index (AI) indicative of abnormal driving of the vehicle with respect to the driver himself/herself. The first score or the Abnormality index (AI) may be stored corresponding to each driver in the database 212. Specifically, the first score or the Abnormality index (AI) may be stored corresponding to each driver ID in the database 212. In one embodiment, the first score or the Abnormality index (AI) is computed using a formula, $$AI = N_K / N_T \quad (2)$$

Where, $N_K$ indicates the number of trips having the kurtosis value greater than the first threshold and $N_T$ indicates the plurality of trips (total number of trips).

At block 316, the processor 202 may determine a second threshold. The second threshold may indicate minimum of the first threshold ($T_h$) determined for each of the plurality of drivers. Let us consider $G_{th}$ as the second threshold indicting the minimum of the first threshold ($T_h$). $G_{th}$ is determined by comparing the first threshold ($T_h$) of each driver stored in the database 212 and selecting minimum of the first threshold ($T_h$) as the second threshold $G_{th}$.

At block 318, the processor 202 may compute a second score for each driver based upon a number of trips having a kurtosis value greater than the second threshold ($G_{th}$) and the plurality of the trips. In one implementation, the second score is a Normalized Abnormality index AI(N) indicative of abnormal driving of the vehicle with respect to the plurality of drivers. The second score or the Normalized Abnormality index AI(N) may be stored corresponding to each driver in the database 212. Specifically, the second score or the Normalized Abnormality index AI(N) may be stored corresponding to each driver ID in the database 212. In one embodiment, the second score or the Normalized Abnormality index AI(N) is computed using a formula, $$AI(N) = N_N / N_T \quad (3)$$

Where, $N_N$ indicates the number of trips having the kurtosis value greater than the second threshold ($G_{th}$) and $N_T$ indicates the plurality of trips (total number of trips).

At block 320, the processor 202 may monitor driving behavior of the driver based upon the first score (AI) and the second score (AI(N)).

At block 322, the processor 202 may further evaluate the driver based on the first score (AI) and the second score (AI(N)). Specifically, the processor 202 may evaluate the driving behavior of a driver with respect to one or more other drivers by comparing the first score and the second score of the driver with the first score and the second score, respectively, associated with the one or more other drivers. The comparison enables ranking of the driver with respect to the one or more other drivers. Specifically, the processor 202 may assign two ranks to each driver based on the first score and the second score computed for each driver. Each driver is ranked such that the driver with highest score is ranked lowest and vice-versa. Therefore, high ranking indicates more risk associated with the driving skill/habits of the driver. The plurality of drivers is therefore ranked accordingly. Further, performance of the driving behavior of each driver may be evaluated/compared vis-à-vis other drivers based upon the ranks assigned to each of the plurality of drivers.

It must be noted that that the above analysis and computation is performed corresponding to acceleration samples captured corresponding to trips monitored for two months. Therefore, the ranking of the drivers may be done corresponding to data captured for a window of two months having overlap of one month. That is, if the window containing acceleration samples for the month of January and February are used to rank the drivers, then in the subsequent window, the acceleration samples for the month of February and March may be analyzed to rank the drivers. Further, it is to be understood that since the acceleration samples corresponding to each window may vary, the ranking of the drivers will also vary accordingly.

Figure 4A:
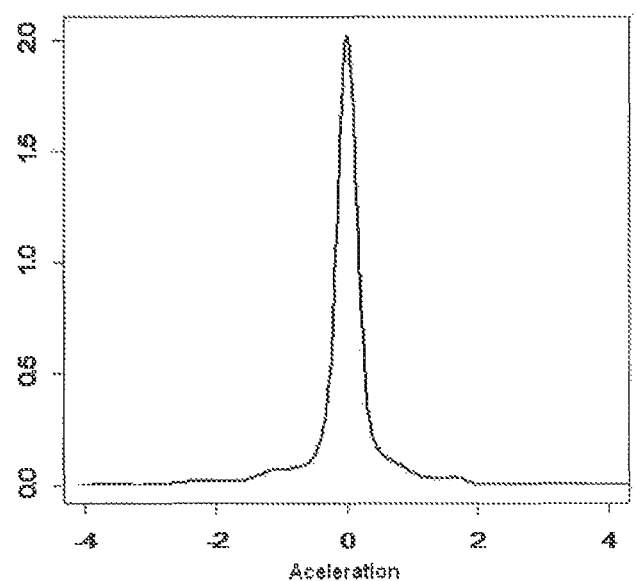
FIG. 4A illustrates a PDF of acceleration samples for a trip in accordance with an embodiment of the present disclosure.

In an exemplary embodiment, assume PDF of reference acceleration data corresponding to reference trips is represented as that shown in FIG. 4A. Based upon the reference acceleration data, Kurtosis ($\beta_2$) and Skewness ($\beta_1$) is computed. Table 1 below illustrates the Kurtosis ($\beta_2$) and Skewness ($\beta_1$) computed corresponding to the reference acceleration data observed for reference trips (Trip 1, Trip 2, Trip 3 and Trip 4).

TABLE 1

Analysis at trip level for few trips

| Trip | Number of acceleration samples | Kurtosis ($\beta_2$) | Skewness ($\beta_1$) |
|---|---|---|---|
| Trip 1 | 1323 | 10.57 | 0.1042 |
| Trip 2 | 682 | 47.29 | 0.5952 |
| Trip 3 | 760 | 8.063 | 0.0795 |
| Trip 4 | 1288 | 6.816 | 1.3829 |

Figure 4B:
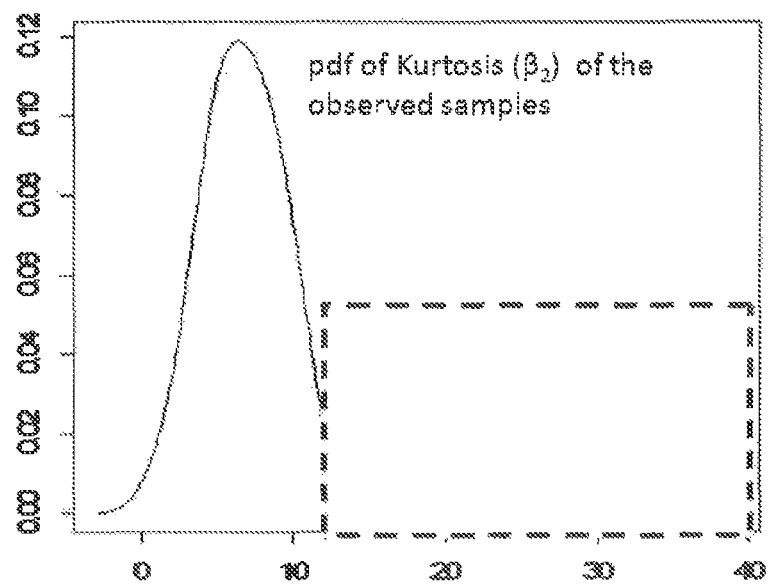
FIG. 4B illustrates identification and omission of rare events (outliers) in accordance with an embodiment of the present disclosure.

In this exemplary embodiment, from the above dataset Kurtosis of all the trips (Trip 1, Trip 2, Trip 3 and Trip 4) are analyzed for a driver and rare events or outliers are identified using pdf of distributions. The rare events or the outliers are shown in FIG. 4B. After removing the outliers or the rare events (shown in FIG. 4B), mean and standard deviation based upon remaining Kurtosis may be calculated. Further, using the equations (1), (2) and (3), a first score (AI) and a second score (N(AI)) is computed. In this exemplary embodiment, the above analysis is done for seven drivers. Further, ranking of the seven drivers based upon the above analysis and scoring is further illustrated referring to Table 2 as below.

TABLE 2

AI and AI (N) based ranking

| Driver | AI (N) (%) In Deviation | Rank in terms of AI | AI(N) % For G_th | Rank In relative performance AI(N) |
|---|---|---|---|---|
| 1 | 2.58 | 3 | 2.575 | 2 |
| 12 | 5.01 | 5 | 5.939 | 5 |
| 13 | 1.41 | 2 | 3.756 | 3 |
| 15 | 0.47 | 1 | 1.567 | 1 |
| 22 | 3.19 | 4 | 4.086 | 4 |
| 2 | 10.24 | 7 | 11.7 | 7 |
| 5 | 7.63 | 6 | 10.4 | 6 |

Exemplary embodiments discussed above may provide certain advantages. Though not required to practice aspects of the disclosure, these advantages may include those provided by the following features.

Some embodiments enable qualitative identification of driver quality vis-à-vis other drivers, wherein the drivers being compared may be selected based on demographic and other similar characteristics.

Some embodiments enable obviating the need of utilizing threshold based acceleration measurements which are known to be impacted by sensor errors. Further, the present disclosure enables mitigating effects of random measurement errors due to imprecise sensors since proposed method of statistical inference relies on building behavioral models using at-least 2 months of continuous observations.

Some embodiments enable measuring longitudinal acceleration using any one of the vehicle speed measuring sensors including a GPS sensor, an accelerometer sensor, an OBD II speed measurement device or a dedicated navigation device installed in the vehicle.

Some embodiments enable creating risk profile for each driver using 2 months window of observations. The two months window is a sliding window with overlap of 1 month. Therefore, the present disclosure enables a driver to learn his/her present risk status vis-à-vis other drivers (in similar category) and improve rapidly. As the driver continues to improve, the effects of older risky driving patterns may be automatically wiped out from his/her risk profile. Although implementations for methods and systems for monitoring driving behavior of a driver have been described in language specific to structural features and/or methods, it is to be understood that the appended claims are not necessarily limited to the specific features or methods described. Rather, the specific features and methods are disclosed as examples of implementations for monitoring driving behavior of the driver.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for monitoring driving behavior of a driver, the system comprising:
    a processor; and
    a memory coupled to the processor, wherein the processor is configured to execute computer-readable instructions stored in the memory in order to:
        capture a plurality of acceleration samples associated with a plurality of trips completed by a plurality of drivers at a predefined time interval, wherein the plurality of acceleration samples is segregated into multiple windows such that each window comprises acceleration samples captured corresponding to a predetermined time window for each driver;
        compute Kurtosis values and Skewness values corresponding to a set of acceleration samples, of the plurality of acceleration samples, associated with each driver;
        filter the Kurtosis values to obtain filtered Kurtosis values, wherein the Kurtosis values are filtered based upon the Skewness values;
        determine a probability distribution function of the filtered Kurtosis values;
        compute a mean and a standard deviation associated with the filtered Kurtosis values based upon the probability distribution function;
        determine a first threshold for each driver based upon the mean and the standard deviation;
        compute a first score for each driver based upon a number of trips having a Kurtosis value greater than the first threshold and the plurality of the trips;
        determine a second threshold, wherein the second threshold is a minimum of the first threshold determined for each of the plurality of drivers;
        compute a second score for each driver based upon a number of trips having a Kurtosis value greater than the second threshold and the plurality of the trips; and
        rank the driver for the predetermined time window by comparing the first score and the second score of the driver with a first score and a second score of one or more drivers with an overlap in the predetermined time window between the driver and the one or more drivers; and
        monitor driving behavior of the driver based upon the rank corresponding to the first score and the second score.

2. The system of claim 1, wherein the processor is further configured to execute a computer-readable instruction in order to evaluate the driving behavior of the driver with respect to one or more other drivers by comparing the first score and the second score of the driver with the first score and the second score, respectively, associated with the one or more other drivers.

3. The system of claim 1, wherein the acceleration samples are captured based upon a speed of a vehicle driven by each driver, and wherein the speed is measured using one of a vehicle speed measuring sensors comprising a GPS sensor, an accelerometer sensor, an OBD II speed measurement device or a dedicated navigation device installed in the vehicle.

4. The system of claim 1, wherein the Kurtosis values are filtered by retaining a set of Kurtosis values having corresponding Skewness values close to zero.

5. The system of claim 1, wherein the probability distribution function is determined by removing outliers from the filtered Kurtosis values and fitting the filtered Kurtosis values, after the removal of the outliers, into a normal distribution function.

6. The system of claim 1, wherein the first threshold is determined using a formula, $Th=\mu+2\sigma$, wherein Th indicates the first threshold, $\mu$ indicates the mean and $\sigma$ indicates the standard deviation.

7. The system of claim 6, wherein the first score is computed using a formula, AI=NK/NT, wherein AI indicates the first score, NK indicates the number of trips having the Kurtosis value greater than the first threshold and NT indicates the plurality of trips.

8. The system of claim 7, wherein the second score is computed using a formula, AI(N)=NN/NT, wherein AI(N) indicates the second score, NN indicates the number of trips having the Kurtosis value greater than the second threshold and NT indicates the plurality of trips.

9. A processor-implemented method for monitoring driving behavior of a driver, the method comprising:

capturing, by a processor, a plurality of acceleration samples associated with a plurality of trips completed by a plurality of drivers at a predefined time interval, wherein the plurality of acceleration samples is segregated into multiple windows such that each window comprises acceleration samples captured corresponding to a predetermined time window for each driver;

computing, by the processor, Kurtosis values and Skewness values corresponding to a set of acceleration samples, of the plurality of acceleration samples, associated with each driver;

filtering, by the processor, the Kurtosis values to obtain filtered Kurtosis values, wherein the Kurtosis values are filtered based upon the Skewness values;

determining, by the processor, a probability distribution function of the filtered Kurtosis values;

computing, by the processor, a mean and a standard deviation associated with the filtered Kurtosis values based upon the probability distribution function;

determining, by the processor, a first threshold for each driver based upon the mean and the standard deviation;

computing, by the processor, a first score for each driver based upon a number of trips having a Kurtosis value greater than the first threshold and the plurality of the trips;

determining, by the processor, a second threshold, wherein the second threshold is a minimum of the first threshold determined for each of the plurality of drivers;

computing, by the processor, a second score for each driver based upon a number of trips having a Kurtosis value greater than the second threshold and the plurality of the trips;

ranking, by the processor, the driver for the predetermined time window by comparing the first score and the second score of the driver with a first score and a second score of one or more drivers with an overlap in the predetermined time window between the driver and the one or more drivers; and monitoring, by the processor, driving behavior of the driver based upon the rank corresponding to the first score and the second score.

10. The method of claim 9 further comprising evaluating, by the processor, the driving behavior of the driver with respect to one or more other drivers by comparing the first score and the second score of the driver with the first score and the second score, respectively, associated with the one or more other drivers.

11. A non-transitory computer readable medium embodying a program executable in a computing device for monitoring driving behavior of a driver, the program comprising:

a program code for capturing a plurality of acceleration samples associated with a plurality of trips completed by a plurality of drivers at a predefined time interval, wherein the plurality of acceleration samples is segregated into multiple windows such that each window comprises acceleration samples captured corresponding to a predetermined time window for each driver;

a program code for computing Kurtosis values and Skewness values corresponding to a set of acceleration samples, of the plurality of acceleration samples, associated with each driver;

a program code for filtering the Kurtosis values to obtain filtered Kurtosis values, wherein the Kurtosis values are filtered based upon the Skewness values;

a program code for determining a probability distribution function of the filtered Kurtosis values;

a program code for computing a mean and a standard deviation associated with the filtered Kurtosis values based upon the probability distribution function;

a program code for determining a first threshold for each driver based upon the mean and the standard deviation;

a program code for computing a first score for each driver based upon a number of trips having a Kurtosis value greater than the first threshold and the plurality of the trips;

a program code for determining a second threshold, wherein the second threshold is a minimum of the first threshold determined for each of the plurality of drivers;

a program code for computing a second score for each driver based upon a number of trips having a Kurtosis value greater than the second threshold and the plurality of the trips;

a program code for ranking the driver for the predetermined time window by comparing the first score and the second score of the driver with a first score and a second score of one or more drivers with an overlap in the predetermined time window between the driver and the one or more drivers; and a program code for monitoring driving behavior of the driver based on the rank corresponding to the first score and the second score.

\* \* \* \* \*